United States Patent
Chuang

(10) Patent No.: US 9,752,360 B2
(45) Date of Patent: Sep. 5, 2017

(54) STRUCTURE OF BIAXIAL SYNCHRONIZATION DUAL-SHAFT HINGE

(71) Applicant: DEDA METAL CO., LTD., New Taipei (TW)

(72) Inventor: Kun-You Chuang, New Taipei (TW)

(73) Assignee: DEDA METAL CO., LTD., New Taipei (TW)

( * ) Notice: Subject to any disclaimer, the term of this patent is extended or adjusted under 35 U.S.C. 154(b) by 0 days.

(21) Appl. No.: 15/344,561

(22) Filed: Nov. 6, 2016

(65) Prior Publication Data
US 2017/0138102 A1   May 18, 2017

(30) Foreign Application Priority Data
Nov. 13, 2015   (TW) .................. 104218256

(51) Int. Cl.
| E05D 3/06 | (2006.01) |
| E05D 5/10 | (2006.01) |
| E05D 11/00 | (2006.01) |
| E05D 11/08 | (2006.01) |
| G06F 1/16 | (2006.01) |
| H04M 1/02 | (2006.01) |

(52) U.S. Cl.
CPC ............... *E05D 3/06* (2013.01); *E05D 5/10* (2013.01); *E05D 11/00* (2013.01); *E05D 11/082* (2013.01); *E05D 2005/102* (2013.01); *E05Y 2900/606* (2013.01); *G06F 1/1681* (2013.01); *H04M 1/0214* (2013.01)

(58) Field of Classification Search
CPC .... E05D 3/12; E05D 3/06; E05D 3/10; E05D 3/18; E05D 2005/102; E05D 2005/106; E05D 5/10; E05D 11/00; E05D 11/082; G06F 1/1681; G06F 1/1616; G06F 1/1618; E05Y 2900/606; H04M 1/0216; H04M 1/0222; H04M 1/022; H04M 1/0214; Y10T 16/547; Y10T 16/5837; Y10T 16/53864; Y10T 16/541; Y10T 16/540255; Y10T 16/533; Y10T 16/5938; H05K 5/0226

See application file for complete search history.

(56) References Cited

U.S. PATENT DOCUMENTS

| 8,776,319 | B1* | 7/2014 | Chang | G06F 1/1681 16/303 |
| 9,103,147 | B1* | 8/2015 | Chuang | G06F 1/1681 |
| 2002/0038493 | A1* | 4/2002 | Ko | H04N 5/2251 16/303 |
| 2011/0157780 | A1* | 6/2011 | Wang | G06F 1/1681 361/679.01 |

(Continued)

*Primary Examiner* — Chuck Mah

(57) ABSTRACT

A biaxial synchronization dual-shaft hinge includes a pivot shaft set including a first pivot shaft and a second pivot shaft arranged in parallel for the mounting of the top cover member and bottom base member of a dual-leaf mobile electronic device, a transmission device set including an interlocking member having a first pivot hole and a second pivot hole respectively coupled to the first pivot shaft and the second pivot shaft, a first driving member pivotally mounted in the first pivot hole and a second driving member pivotally mounted in the second pivot hole for enabling the first pivot shaft and the second pivot shaft to be synchronously rotated in reversed direction steadily.

6 Claims, 10 Drawing Sheets

(56) References Cited

U.S. PATENT DOCUMENTS

| | | | | |
|---|---|---|---|---|
| 2011/0289726 A1* | 12/2011 | Zhang | .................... | G06F 1/1681 |
| | | | | 16/250 |
| 2012/0192381 A1* | 8/2012 | Zhang | .................... | G06F 1/1681 |
| | | | | 16/366 |
| 2013/0016489 A1* | 1/2013 | Yeh | ........................ | G06F 1/1681 |
| | | | | 361/807 |
| 2013/0016492 A1* | 1/2013 | Wang | ........................ | E05D 3/18 |
| | | | | 361/820 |
| 2013/0318746 A1* | 12/2013 | Kuramochi | ............ | G06F 1/1681 |
| | | | | 16/342 |
| 2014/0360296 A1* | 12/2014 | Hsu | ........................ | G06F 1/1616 |
| | | | | 74/98 |
| 2015/0184439 A1* | 7/2015 | Hsu | ............................ | G06F 1/16 |
| | | | | 16/350 |
| 2015/0327383 A1* | 11/2015 | Hsu | ...................... | H05K 5/0226 |
| | | | | 16/366 |

* cited by examiner

STRUCTURE OF BIAXIAL SYNCHRONIZATION DUAL-SHAFT HINGE

BACKGROUND OF THE INVENTION

1. Field of the Invention

The present invention relates to hinge technology and more particularly, to a structure of biaxial synchronization dual-shaft hinge, which uses a transmission device set to control synchronous rotation of the first pivot shaft and second pivot shaft of a pivot shaft set in reversed direction, so that the top cover member and bottom base member of the dual-leaf mobile electronic device that are respectively affixed to the first and second pivot shafts can be accurately and stably opened and closed.

2. Description of the Related Art

Various dual-shaft hinges are known and widely used in notebook computers, smart phones and many other dual-leaf mobile electronic devices to connect a top cover member and a bottom base member of a dual-leaf mobile electronic device together, allowing the top cover member and the bottom base member to be closed and opened. These dual-shaft hinges will generate a friction force during rotation of the respective male pivot shaft members relative to the respective female when the user bias the top cover member of the dual-leaf mobile electronic device relative to the bottom base member, enabling the top cover member to be positioned at the desired angle. However, after a long use, the friction force will be reduced and the rotation sequence of the male pivot shaft components can not be ensured, affecting the positioning accuracy and biasing stability of the top cover member of the dual-leaf mobile electronic device.

SUMMARY OF THE INVENTION

The present invention has been accomplished under the circumstances in view. It is therefore the main object of the present invention to provide a structure of biaxial synchronization dual-shaft hinge, which uses a transmission device set with a first driving member and a second driving member thereof pivotally mounted in an interlocking member in an eccentric manner to control synchronous rotation of two pivot shafts in reversed directions, so that the top cover member and bottom base member of the dual-leaf mobile electronic device that are respectively affixed to the two pivot shafts can be accurately and stably opened and closed.

To achieve this and other objects of the present invention, a biaxial synchronization dual-shaft hinge comprises a pivot shaft set, a position-limiting device set and at least one transmission device set. The pivot shaft set comprises a first pivot shaft with a first shaft body, and a second pivot shaft with a second shaft body. The position-limiting device set is mounted on the first shaft body and second shaft body of the pivot shaft set to control the distance between the axis of the first shaft body and the axis of the second shaft body. Each transmission device set comprises an interlocking member, a first driving member and a second driving member. The interlocking member comprises a first pivot hole and a second pivot hole. Further, the distance between the center of the first pivot hole and the center of the second pivot hole is equal to the distance between the axis of the first shaft body of the pivot shaft set and the axis of the second shaft body. The first driving member comprises a first positioning hole. Further, the first driving member is pivotally mounted in the first pivot hole of the interlocking member in such a manner that the center of the first positioning hole is disposed at one side relative to the center of the first pivot hole. Further, the first positioning hole is fastened to the first shaft body of the pivot shaft set. The second driving member comprises a second positioning hole. Further, the second driving member is pivotally mounted in the second pivot hole of the interlocking member in such a manner that the center of the second positioning hole is disposed at one side relative to the center of the second pivot hole. Further, the second positioning hole is fastened to the second shaft body of the pivot shaft set.

DETAILED DESCRIPTION OF THE PREFERRED EMBODIMENT

Figure 1:
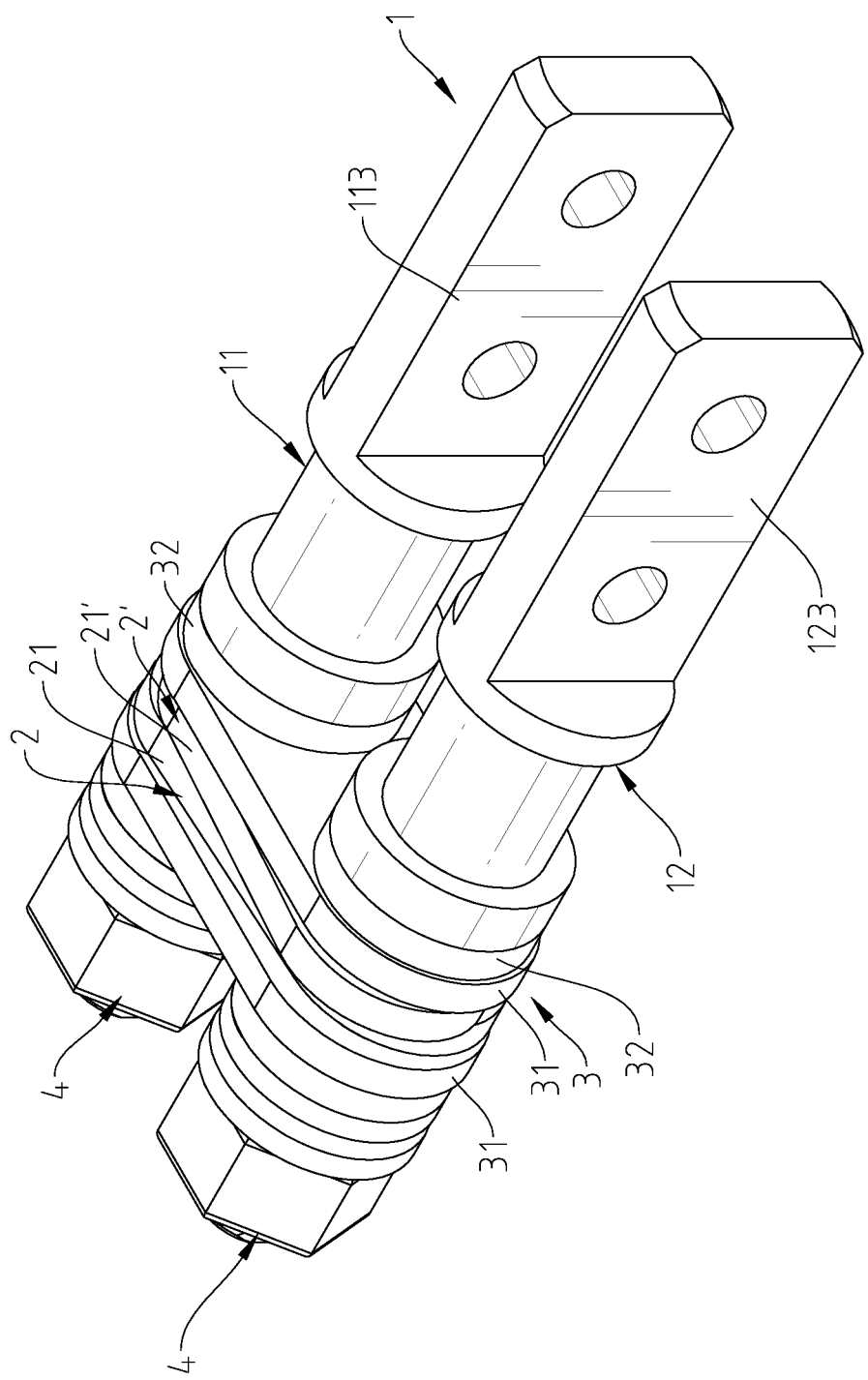
FIG. 1 is an elevational view of a structure of biaxial synchronization dual-shaft hinge in accordance with the present invention.
Figure 2:
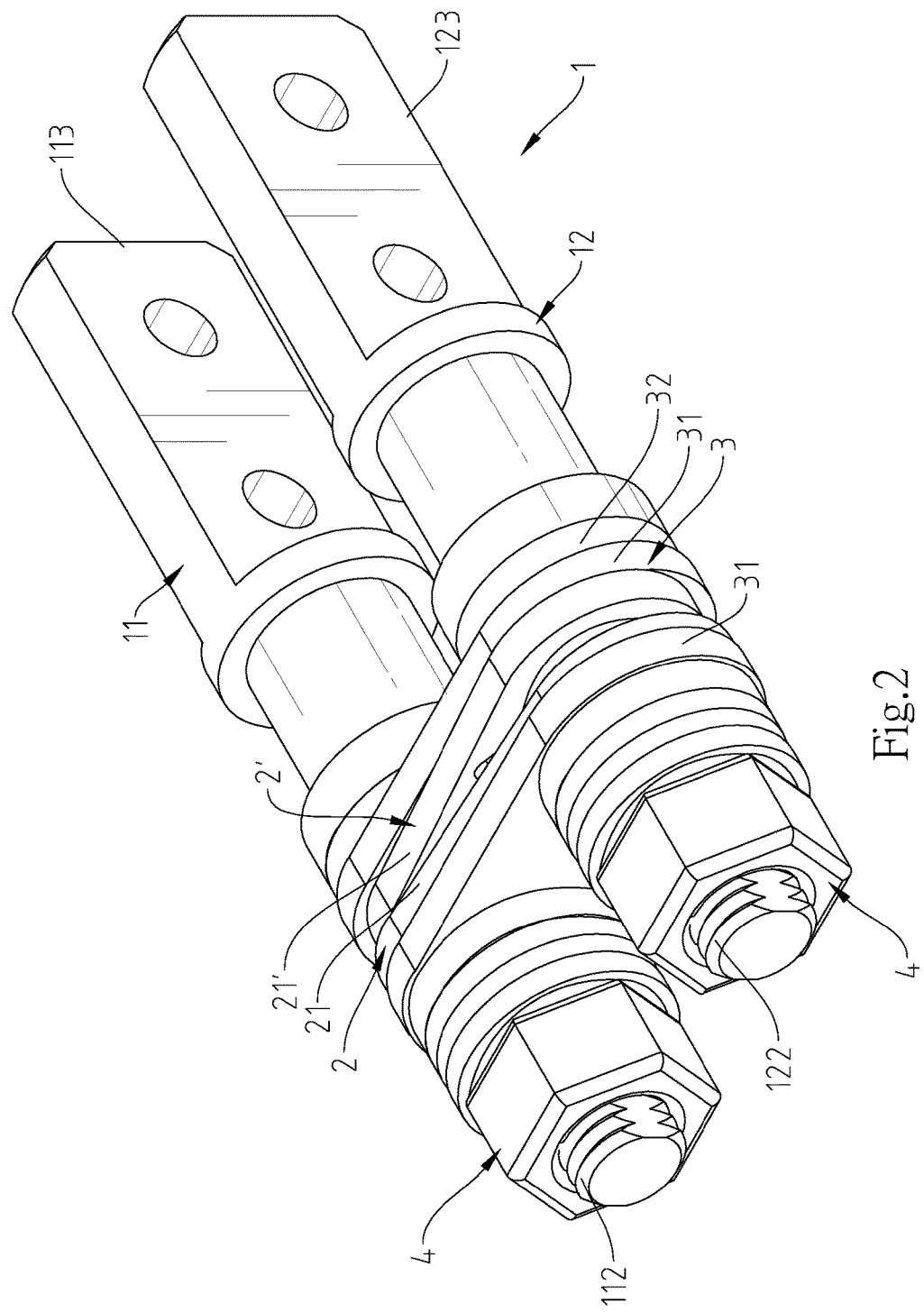
FIG. 2 corresponds to FIG. 1 when viewed from another angle.
Figure 3:
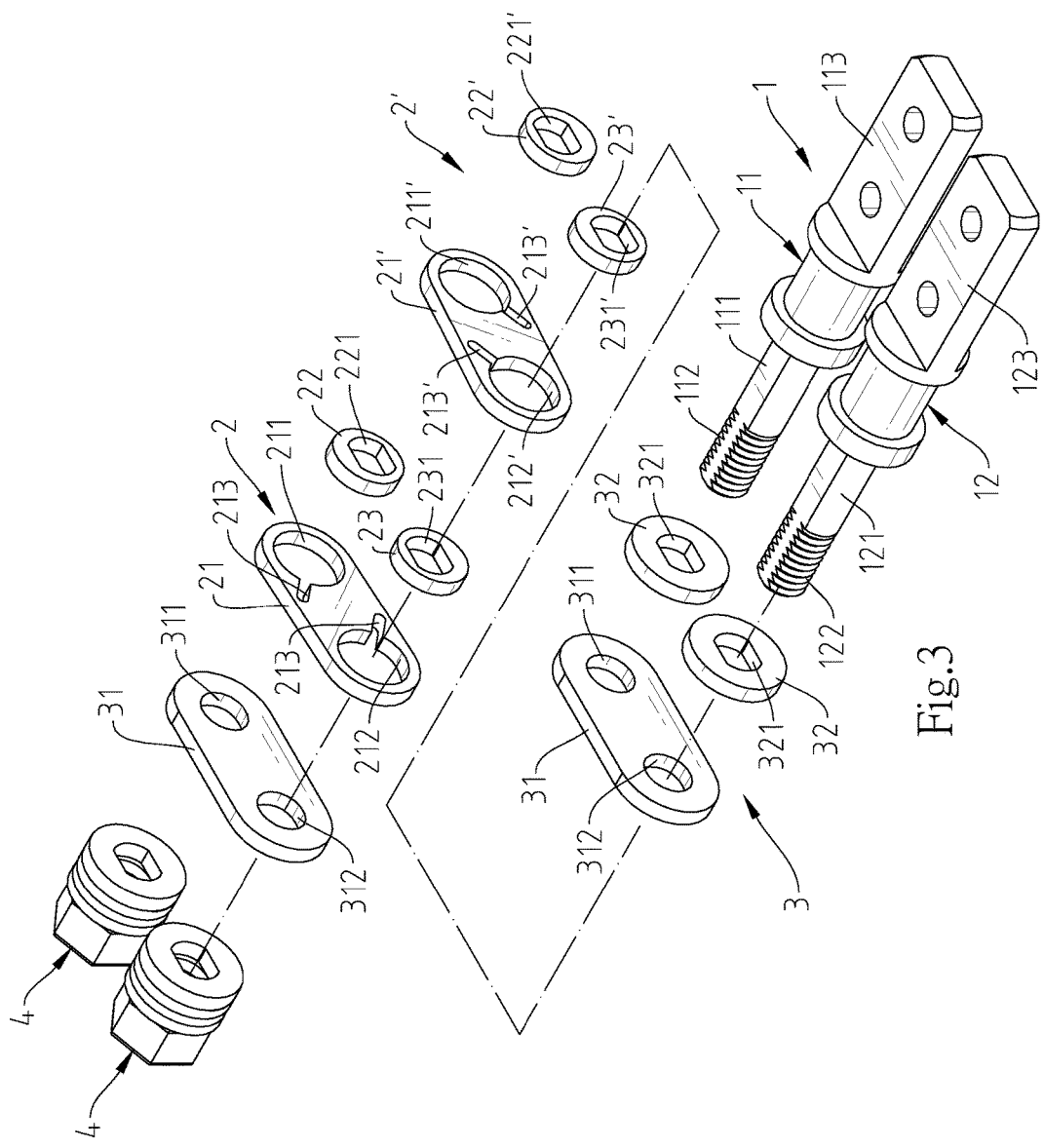
FIG. 3 is an exploded view of the structure of biaxial synchronization dual-shaft hinge in accordance with the present invention.

Referring to FIGS. 1-3, a structure of biaxial synchronization dual-shaft hinge in accordance with the present invention is shown. The biaxial synchronization dual-shaft hinge comprises a pivot shaft set 1, two transmission device sets (2;2'), a position-limiting device set 3 and a torque adjustment members 4.

The pivot shaft set 1 comprises a first pivot shaft 11 and a second pivot shaft 12 arranged in parallel. The first pivot shaft 11 comprises a first shaft body 111, a first threaded tip 112 axially extended from one end of the first shaft body 111, and a first mounting portion 113 axially extended from an opposite end of the first shaft body 111. Further, the first shaft body 111 has a non-circular cross-section. The second pivot shaft 12 comprises a second shaft body 121, a second threaded tip 122 axially extended from one end of the second shaft body 121, a second mounting portion 123 axially extended from an opposite end of the second shaft body 121. Further, the second shaft body 121 has a non-circular cross-section.

Each transmission device set (2;2') comprises a interlocking member (21;21'), a first driving member (22;22') and a second driving member (23;23'). The interlocking member (21;21') comprises a first pivot hole (211;211') and a second pivot hole (212;212') arranged in parallel, and two elastic slots (213;213') respectively disposed in communication with the first pivot hole (211;211') and the second pivot hole (212;212'). Further, the distance between the center of the first pivot hole (211;211') and the center of the second pivot hole (212;212') is equal to the distance between the axis of the first shaft body 111 and the axis of the second shaft body 121 of the pivot shaft set 1. The first driving members (22;22') of the two transmission device sets (2;2') are respectively pivotally mounted in the first pivot holes (211;211') of the respective interlocking member (21;21'). The second driving members (23;23') of the two transmission device sets (2;2') are respectively pivotally mounted in the second pivot holes (212;212') of the respective interlocking member (21;21'). Each first driving member (22;22') comprises a first positioning hole (221;221'). The center of the first positioning hole (221;221') of each first driving member (22;22') is disposed at one side relative to the center of the associating first pivot hole (211;211'). Further, the first positioning hole (221;221') of each first driving member (22;22') is non-circular and fastened to the first shaft body 111 of the first pivot shaft 11 of the pivot shaft set 1. Each second driving member (23;23') comprises a second positioning hole (231; 231'). The center of the second positioning hole (231;231') of each second driving member (23;23') is disposed at one side relative to the center of the associating second pivot hole (212;212'). Further, the second positioning hole (231; 231') is non-circular and fastened to the second shaft body 121 of the second pivot shaft 12 of the pivot shaft set 1. Further, the two transmission device sets (2;2') are arranged in parallel.

The position-limiting device set 3 comprises two position-limiting plates 31 and two fittings 32. Each position-limiting plate 31 comprises a first position-limiting hole 311 and a second position-limiting hole 312. The first position-limiting hole 311 is pivotally coupled to the first shaft body 111 of the first pivot shaft 11 of the pivot shaft set 1. The second position-limiting hole 312 is pivotally coupled to the second shaft body 121 of the second pivot shaft 12 of the pivot shaft set 1. Further, the two position-limiting plates 31 are respectively disposed at two opposite sides of the transmission device sets 2. Each fitting 32 comprises a coupling hole 321. The coupling holes 321 of the fittings 32 are respectively pivotally coupled to the first shaft body 111 and second shaft body 121 of the pivot shaft set 1. Further, the fittings 32 are disposed at one side of the position-limiting plates 31 opposite to the transmission device sets 2.

The two torque adjustment members 4 are respectively threaded onto the first and second threaded tips 112;122 of the first and second pivot shafts 11;12 of the pivot shaft set 1.

The operation of the biaxial synchronization dual-shaft hinge will now be described hereinafter with reference to FIGS.

Figure 4:
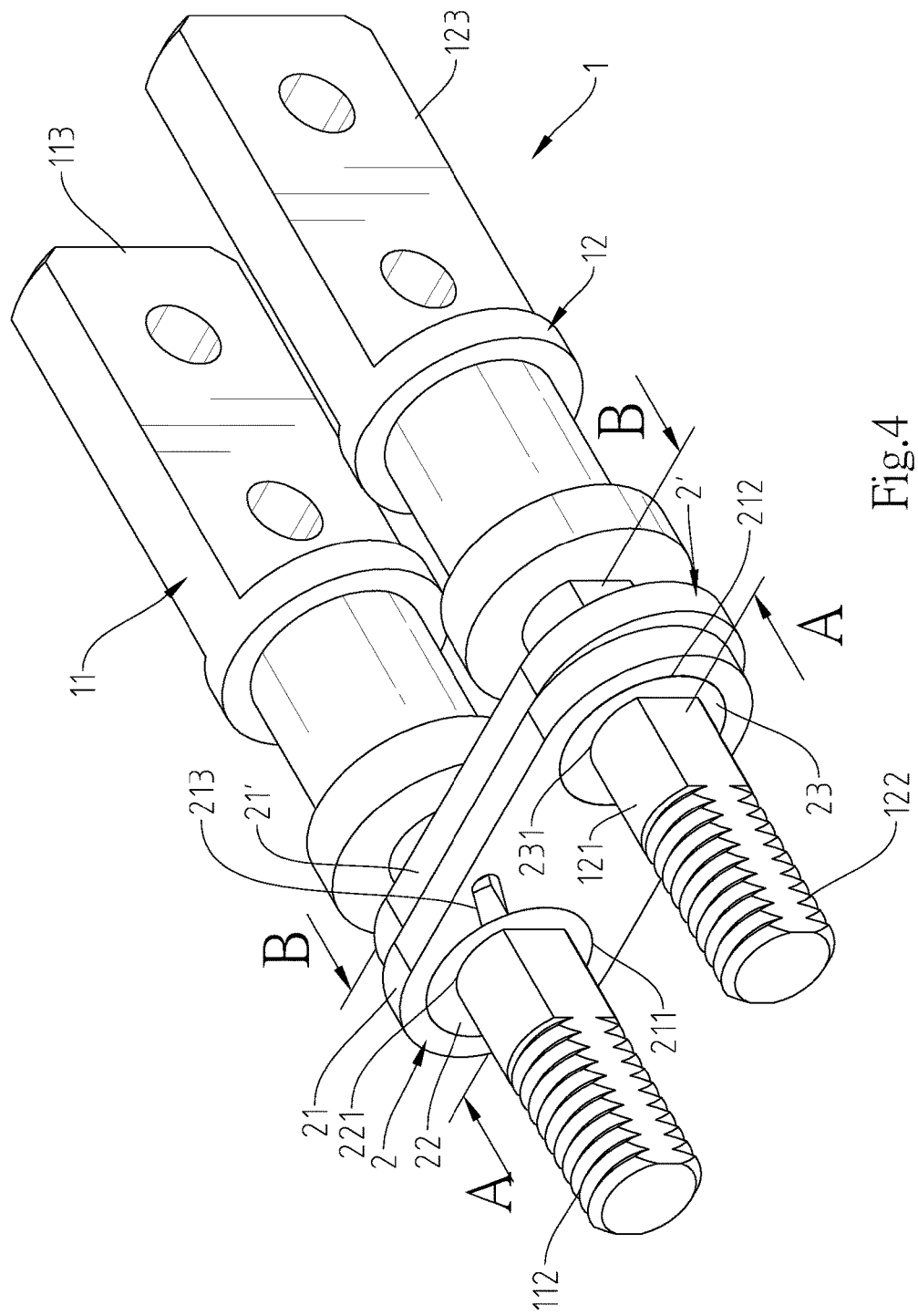
FIG. 4 is a schematic operational view of the present invention (I).
Figure 5:
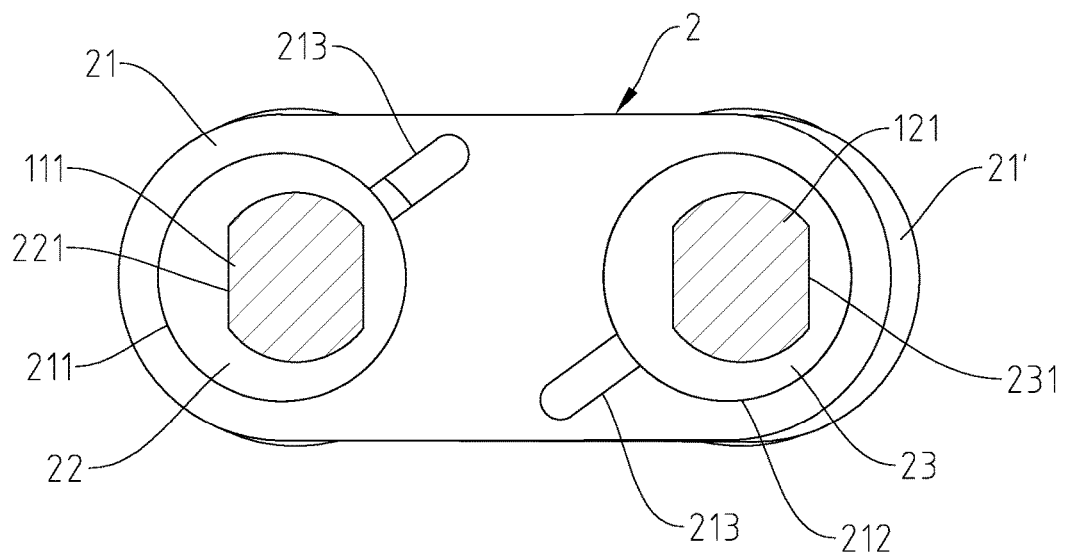
FIG. 5 is a sectional view taken along line A-A of FIG. 4.
Figure 6:
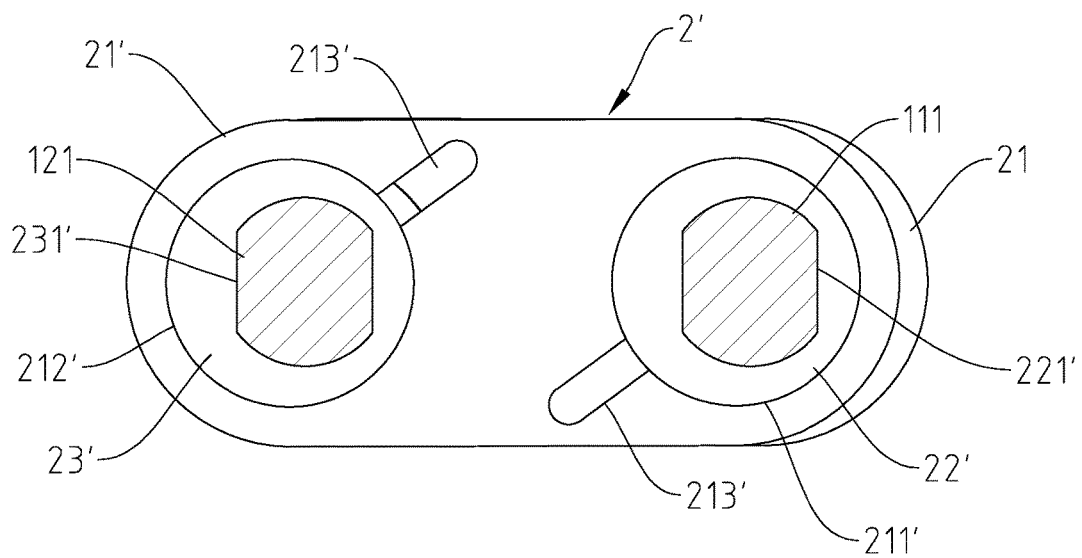
FIG. 6 is a sectional view taken along line B-B of FIG. 4.
Figure 7:
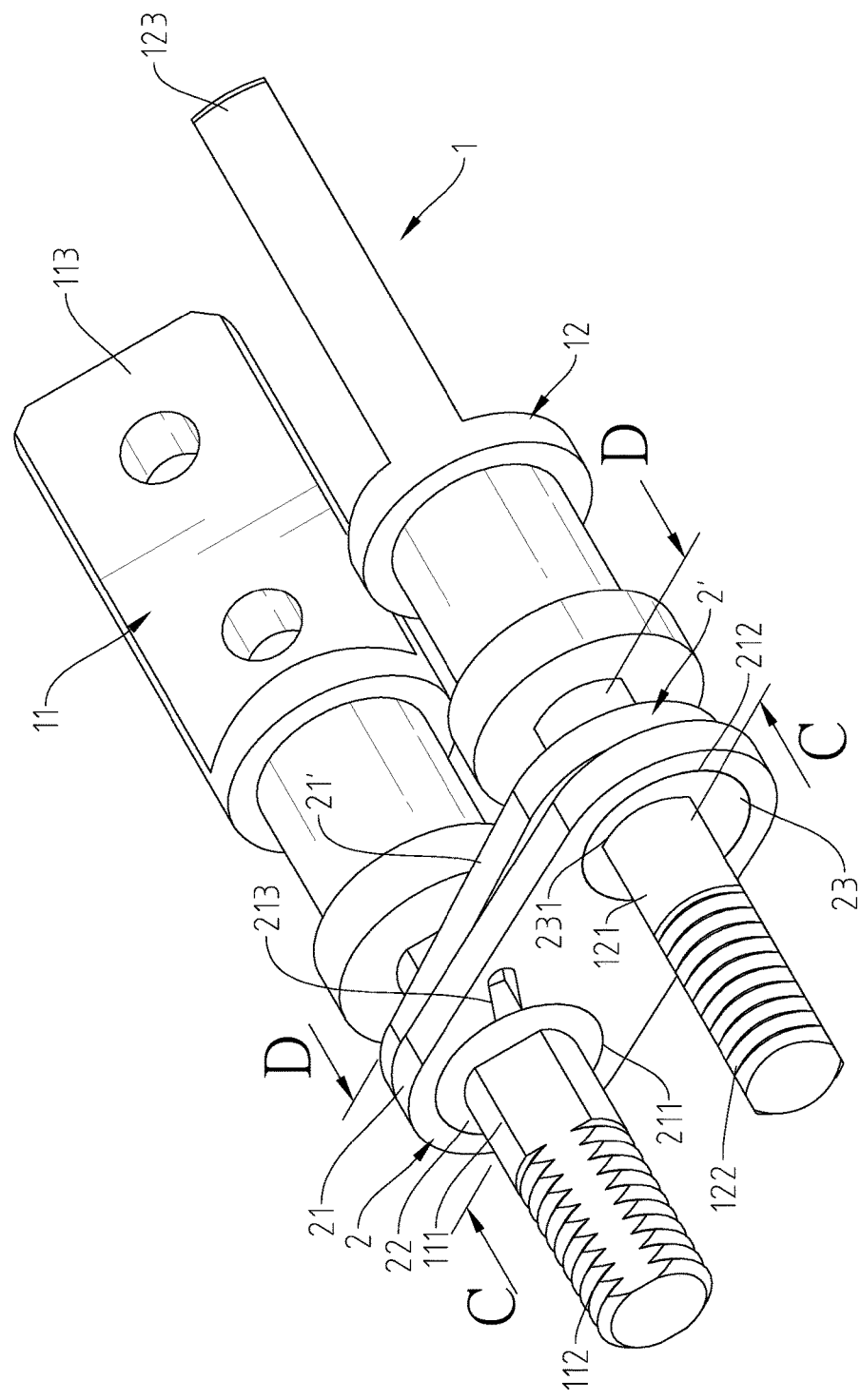
FIG. 7 is a schematic operational view of the present invention (II).
Figure 8:
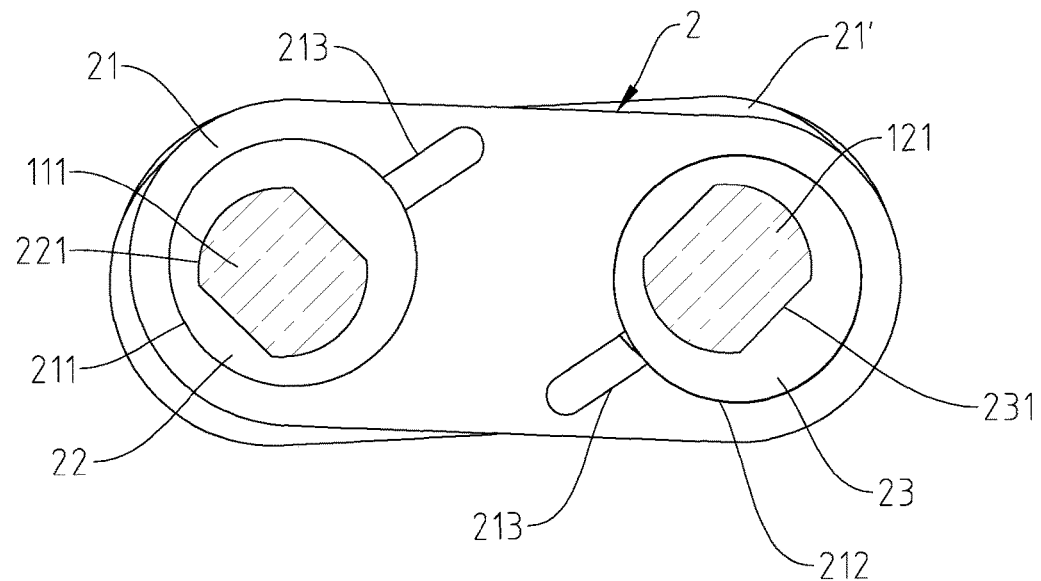
FIG. 8 is a sectional view taken along line C-C of FIG. 7.
Figure 9:
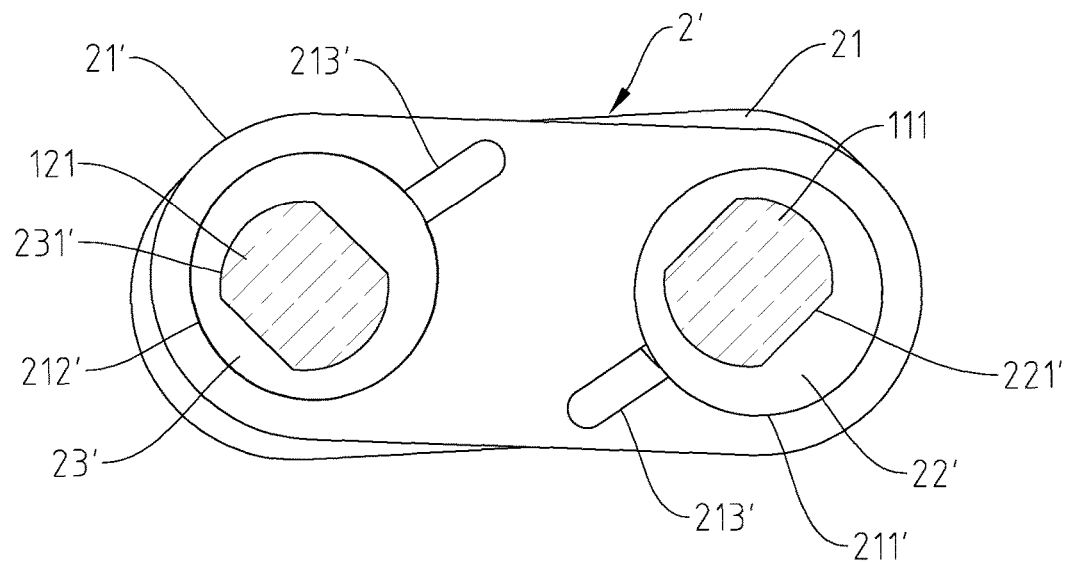
FIG. 9 is a sectional view taken along line D-D of FIG. 7.
Figure 10:
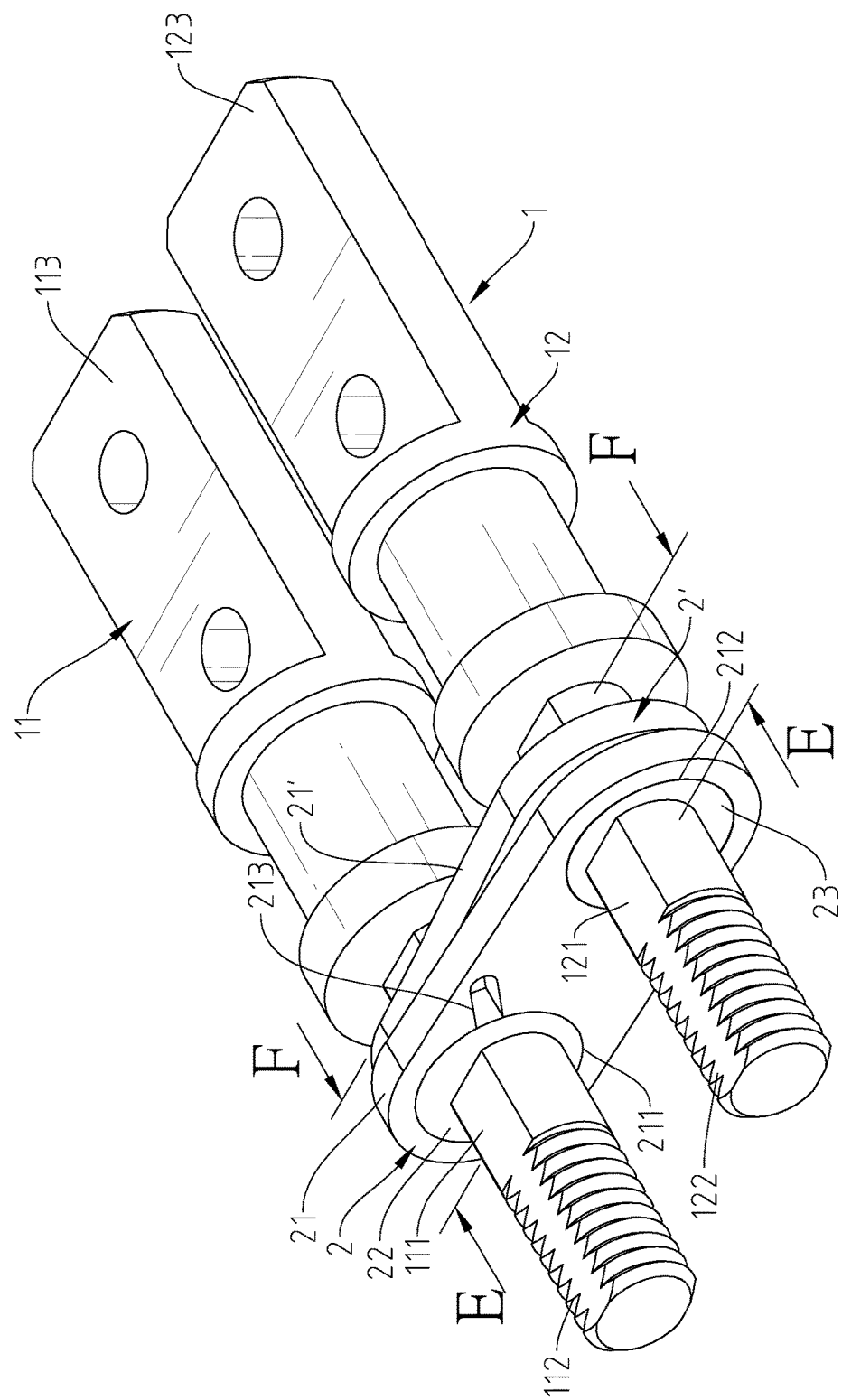
FIG. 10 is a schematic operational view of the present invention (III).
Figure 11:
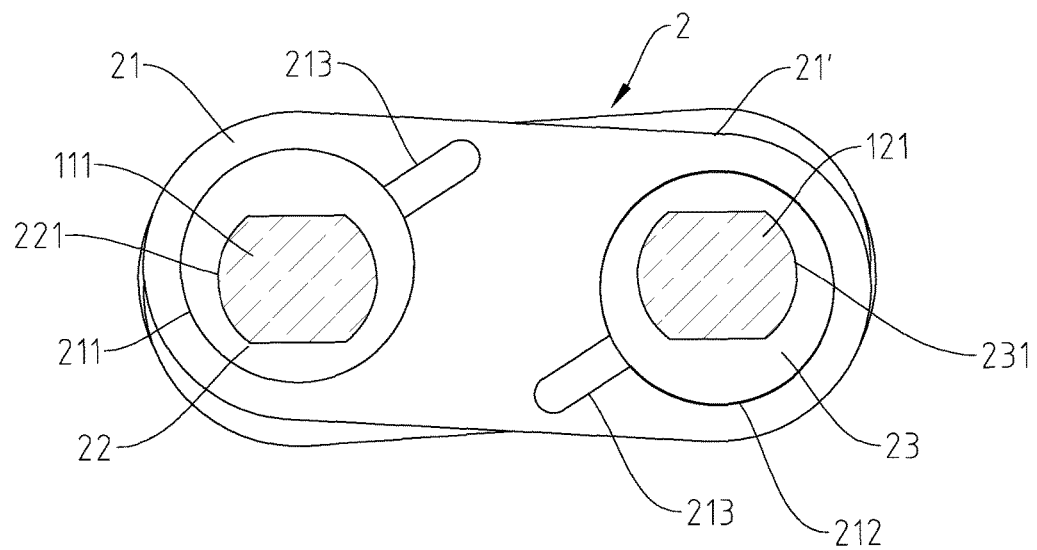
FIG. 11 is a sectional view taken along line E-E of FIG. 10.
Figure 12:
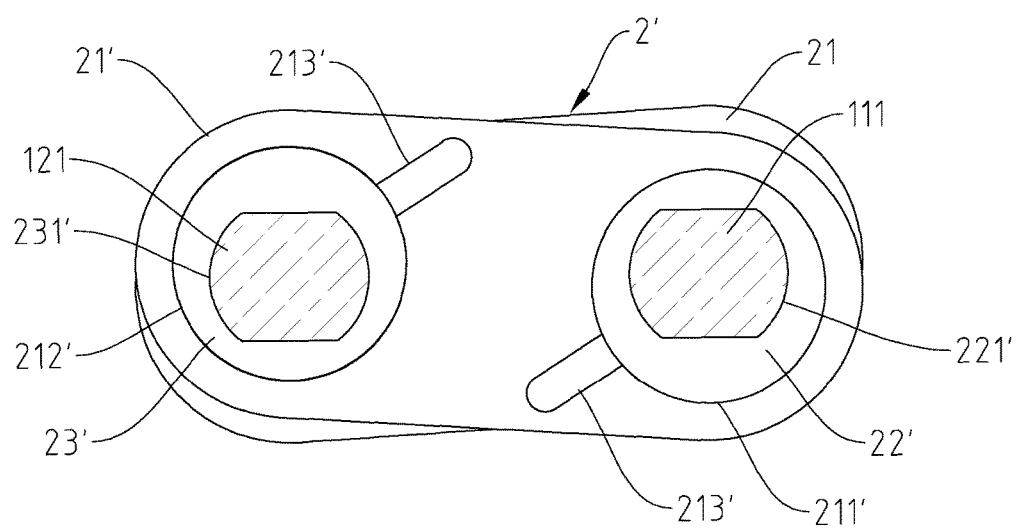
FIG. 12 is a sectional view taken along line F-F of FIG. 10.

4-12. As illustrated in FIGS. 4-6, when the first pivot shaft 11 and second pivot shaft 12 of the pivot shaft set 1 are in the initial state, the first mounting portion 113 and the second mounting portion 123 are kept in parallel, i.e., the top cover member and the bottom base member of the dual-leaf mobile electronic device (not shown) that are respectively affixed to the first mounting portion 113 and the second mounting portion 123 are maintained close to each other; the eccentric direction of the first pivot hole 211 of the transmission device set 2 is reversed to the eccentric direction of the second pivot hole 212; the eccentric direction of the respective first pivot holes (211;211') of the transmission device set (2;2') is reversed to the eccentric direction of the respective second pivot holes (212;212'). As illustrated in FIGS. 7-9, when rotating the first pivot shaft 11 of the pivot shaft set 1, the first driving members (22;22') are rotated with the first pivot shaft 11. Due to that the center of the first positioning hole (221;221') of each first driving member (22;22') is disposed at one side relative to the center of the associating first pivot hole (211;211'), the rotary motion of the first driving members (22;22') are constrained by the respective interlocking members (21;21'), and thus, the second driving members (23;23') should be synchronously rotated in reversed directions relative to the respective first driving members (22;22'), causing the first pivot shaft 11 and the second pivot shaft 12 to be rotated synchronously in reversed directions. Thereafter, as shown in FIGS. 10-12, due to that the first pivot shaft 11 and the second pivot shaft 12 are synchronously rotated in the revered directions, when the first pivot shaft 11 is rotated through 90° angle, the second pivot shaft 12 is also reversed through 90° angle, and thus, the top cover member and bottom base member of the dual-leaf mobile electronic device that are respectively affixed to the first mounting portion 113 and the second mounting portion 123 are kept in parallel. Because the first pivot shaft 11 and the second pivot shaft 12 are synchronously rotated during the operation of the biaxial synchronization dual-shaft hinge, the rotary motion of the first pivot shaft 11 and the second pivot shaft 12 can be smoothly and steadily smoothly performed without being affected by the torque.

Figure 13:
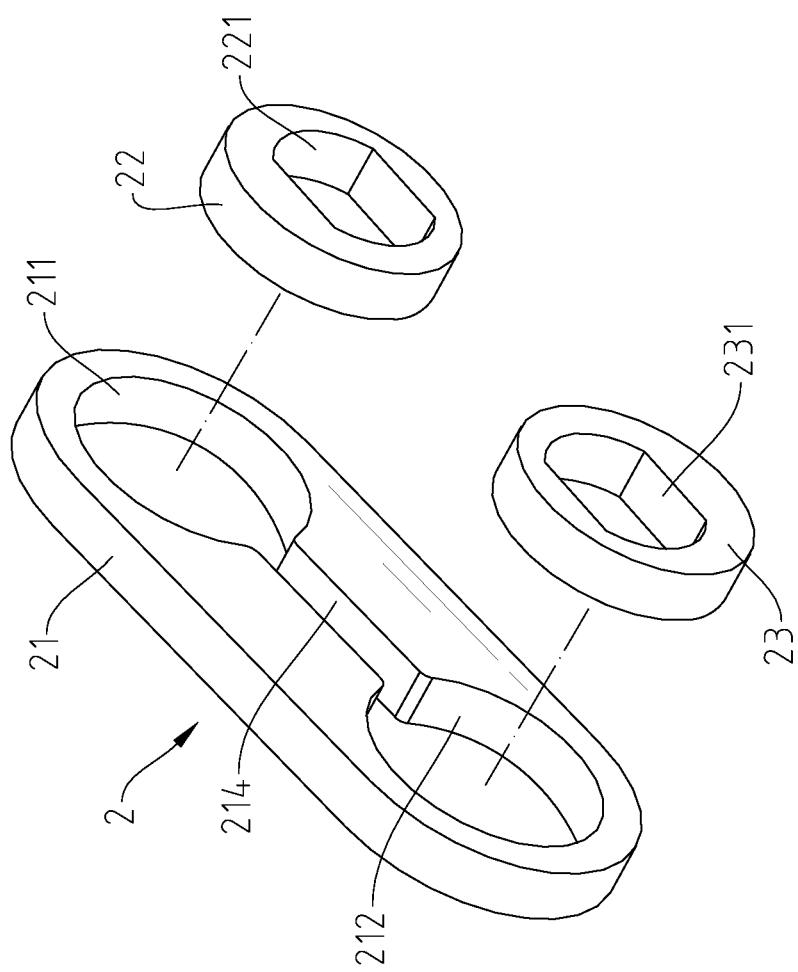
FIG. 13 is an exploded view of an alternate form of the transmission device set.

Referring to FIG. 13, an alternate form of the interlocking member 21 of the transmission device set 2 is shown. As illustrated, the interlocking member 21 further comprises an elongated elastic slot 214 connected between the first pivot hole 211 and the second pivot hole 212.

What the invention claimed is:

1. A structure of biaxial synchronization dual-shaft hinge, comprising:
    a pivot shaft set comprising a first pivot shaft and a second pivot shaft arranged in parallel, said first pivot shaft comprising a first shaft body, said second pivot shaft comprising a second shaft body;
    a position-limiting device set mounted on said first shaft body and said second shaft body to control the distance between the axis of said first shaft body and the axis of said second shaft body; and
    at least one transmission device set, each said transmission device set comprising an interlocking member, a first driving member and a second driving member, said interlocking member comprising a first pivot hole and a second pivot hole, the distance between the center of said first pivot hole and the center of said second pivot hole being equal to the distance between the axis of said first shaft body of said pivot shaft set and the axis of said second shaft body, said first driving member comprising a first positioning hole, said first driving member being pivotally mounted in said first pivot hole of said interlocking member in such a manner that the center of said first positioning hole is disposed at one side relative to the center of said first pivot hole, said first positioning hole being fastened to said first shaft body of said pivot shaft set, said second driving member comprising a second positioning hole, said second driving member being pivotally mounted in said second pivot hole of said interlocking member in such a manner that the center of said second positioning hole is disposed at one side relative to the center of said second pivot hole, said second positioning hole being fastened to said second shaft body of said pivot shaft set.

2. The structure of biaxial synchronization dual-shaft hinge as claimed in claim 1, wherein the number of said at least one transmission device set is plural, and the multiple said transmission device sets are arranged in parallel.

3. The structure of biaxial synchronization dual-shaft hinge as claimed in claim 1, wherein said position-limiting device set comprises at least one position-limiting plate disposed at one side of said at least one transmission device set, each said position-limiting plate comprising a first position-limiting hole and a second position-limiting hole respectively fastened to said first shaft body and said second shaft body of said pivot shaft set.

4. The structure of biaxial synchronization dual-shaft hinge as claimed in claim 1, wherein said interlocking member further comprises two elastic slots respectively connected to said first pivot hole and said second pivot hole.

5. The structure of biaxial synchronization dual-shaft hinge as claimed in claim 1, wherein said interlocking member further comprises an elongated elastic slot connected between said first pivot hole and said second pivot hole.

6. The structure of biaxial synchronization dual-shaft hinge as claimed in claim 1, wherein said pivot shaft set further comprises a first threaded tip axially extended from one end of said first shaft body, a second threaded tip axially extended from one end of said second shaft body, and two torque adjustment members respectively threaded onto said first threaded tip and said second threaded tip for adjusting a torque applied to each shaft.

* * * * *